United States Patent [19]

Charles

[11] Patent Number: 4,508,584

[45] Date of Patent: Apr. 2, 1985

[54] TAPE-LAYING HEAD

[75] Inventor: Paul A. S. Charles, Rockford, Ill.

[73] Assignee: The Ingersoll Milling Machine Company, Rockford, Ill.

[21] Appl. No.: 556,922

[22] Filed: Dec. 1, 1983

[51] Int. Cl.³ .............................................. B32B 31/00
[52] U.S. Cl. .................... 156/353; 156/361; 156/433; 156/517; 156/526; 156/527; 156/540
[58] Field of Search .............. 156/517, 518, 540, 523, 156/526, 527, 433, 361, 353

[56] References Cited

U.S. PATENT DOCUMENTS

| | | | |
|---|---|---|---|
| 3,574,040 | 4/1971 | Chitwood et al. | 156/522 |
| 3,755,060 | 8/1973 | Bullock | 156/441 |
| 3,775,219 | 11/1973 | Karlson et al. | 156/526 |
| 3,810,805 | 3/1974 | Goldsworth et al. | 156/361 |
| 4,133,711 | 1/1979 | August et al. | 156/353 |
| 4,285,752 | 8/1981 | Higgins | 156/522 |
| 4,292,108 | 9/1981 | Weiss et al. | 156/353 |
| 4,382,836 | 5/1983 | Frank | 156/526 |
| 4,419,170 | 12/1983 | Blad | 156/522 |

*Primary Examiner*—Edward Kimlin
*Attorney, Agent, or Firm*—Fitch, Even, Tabin & Flannery

[57] ABSTRACT

Disclosed is a tape-laying mechanism and method for constructing sheet layments of composite resin-embedded filamentous material in incremental tape form. A pair of tape-laying heads are mounted side by side for simultaneous operation with their tapes spaced apart an integer multiple of the tape-width. Controlled movement of a tape-laying subcarriage of each mechanism draws tape from a supply before implanting it progressively on the laying surface by return movement of the subcarriage. Tape is laid without movement of the mechanism as a whole other than for lateral indexing, and the mechanism allows lateral indexing while the tape is being drawn out to length above the laying surface before it is implanted.

7 Claims, 10 Drawing Figures

TAPE-LAYING HEAD

This invention relates to a method and machine for constructing a laminar sheet of so-called composite material by laying the material down incrementally in tape form.

The term "composite material" as here used refers to fibrous or filamentous material embedded in a matrix of resin which, when cured to the rigid state, maintains the position of the fibrous or filamentous core material within the matrix when subjected to load. The high strength-to-weight ratios of such materials, and their adaptability to the fabrication of sheet or shell structures, has lead to their extensive use in aircraft, particularly for control surfaces and the like.

The method and machine of the present invention are adapted for laying up sheet structures of material in irregular outline with a minimum of trim waste. Moreover, as the invention is particularly suited to the laying of composite materials wherein the filamentary core material comprises a multiplicity of continuous parallel filaments, it also lends itself to the construction of laminar structures with directional strength characteristics.

Tape-laying mechanisms of the general kind described are known in the art, and typically comprise a tape-laying head suspended from the turntable of a gantry carriage which may be raised or lowered to move the tape head toward and away from a laying surface, platen or the like, and rotated about a vertical axis to align it in the desired laying direction in which the tape head is then bodily moved by coordinated biaxial or triaxial movement of the gantry carriage.

The necessity for bodily wielding the entire tape-laying head necessarily slows the laying process due to the inertia of its relatively large mass, particularly when used for smaller sheet shapes for which the composite material is preferably supplied in narrow tape form.

The method and machine of the present invention are directed to the speedier laying of composite material in narrow tape form by a technique and mechanism which does not require the movement of the entire tape-laying head when laying tapes of relatively lesser length, e.g., up to 30 inches, but which may nevertheless be used in the mode of known equipment, i.e., by bodily moving the entire tape-laying head by gantry movement, for laying longer tapes.

BRIEF DESCRIPTION OF THE INVENTION

This goal is accomplished in the method and mechanism of this invention by mounting the tape-laying presser roll for vertical movement on a subcarriage movable horizontally on the frame of the machine head to draw the tape from the tape supply in measured, severed length without contact with the laying surface. The presser roll is lowered to implant the end of the tape of composite material upon the laying surface, and the subcarriage retracted to roll the presser roll back over the tape to press it to that surface while simultaneously stripping the backing tape from the composite material.

The mechanism is equally useable in the conventional mode for laying tape lengths in excess of the available travel of the subcarriage, in which case the subcarriage simply remains in place, the tape-laying head is moved by bi- or triaxial movement of its gantry mount or equivalent support to position the end of the tape of composite material at the desired starting point, at which point it is implanted by the presser roll which then rolls progressively over the measured and severed length of tape as it is drawn from the supply by the advancing movement of the entire tape-laying head.

DESCRIPTION OF THE DRAWINGS

This novel mechanism for laying tape is described in detail in the following specification in conjunction with the accompanying drawings, in which.

GENERAL STRUCTURAL OUTLINE

Figure 2:
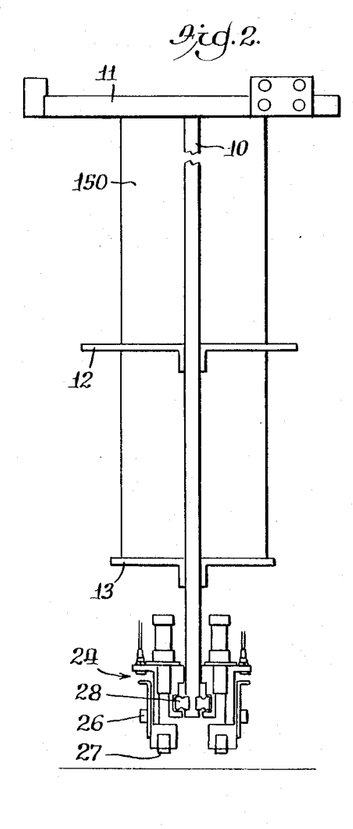
FIG. 2 is a right-hand end elevational view of the same with most of the apparatus removed to illustrate the suspending frame upon which the operating components are assembled.

The structural framing of the tape-laying mechanism of the invention comprises a central plate 10 (FIG. 2) preferably of aluminum alloy, of sufficient thickness to provide rigid support for the duplicate tape mechanisms which it carries on its opposite faces in saddle-bag fashion, and, at its upper edge, a suspension plate 11 to which the central plate is screwed, and by means of which the frame in its entirety, and all of the mechanism it carries, is suspended from the turntable of a gantry carriage. The latter, being of conventional format, is not illustrated. The various components of each tape-laying mechanism are either secured directly to the central plate 10 or to support shelves 12 and 13 secured to thereto (FIG. 2).

Figures 1, 3:
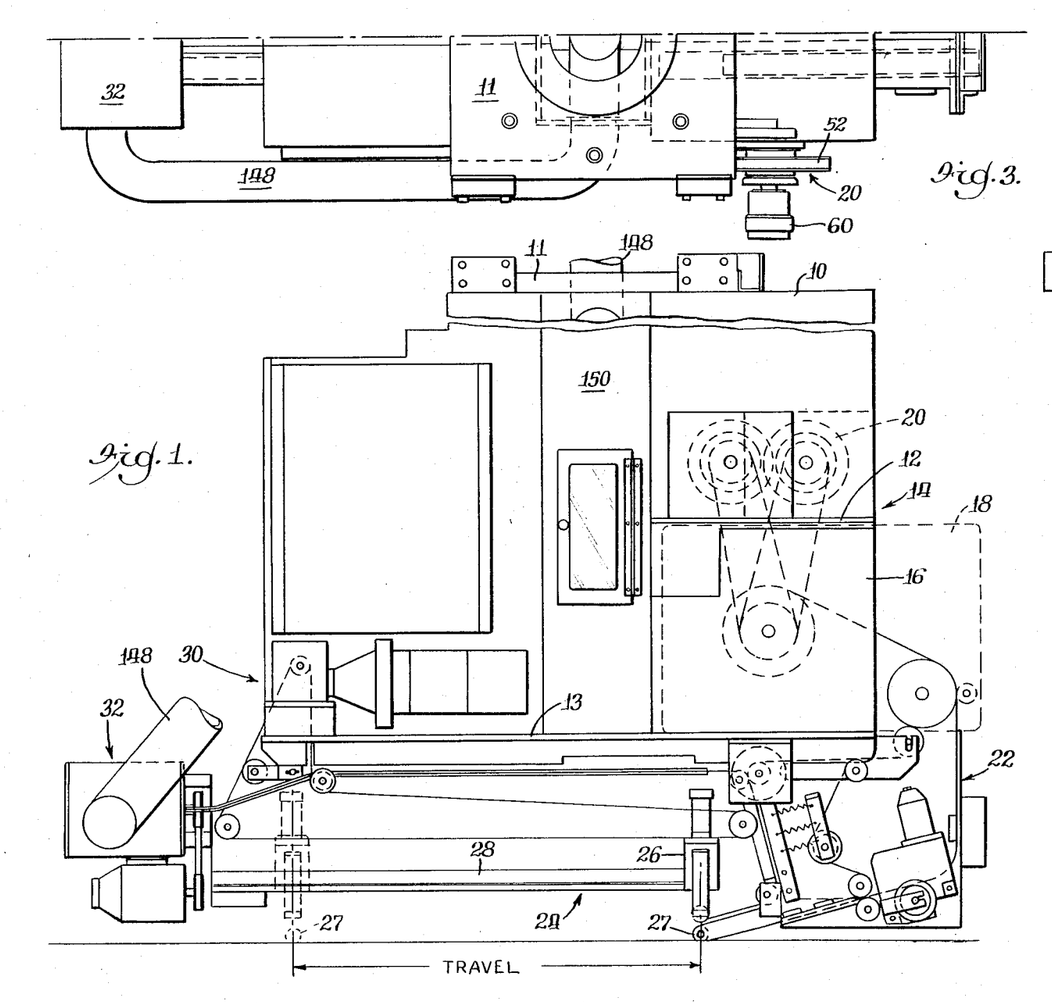
FIG. 1 is a side elevational view of the tape-laying machine head of the invention.
FIG. 3 is a partial plan view of the mechanism shown in FIG. 1, showing half of the mechanism on one side of a central vertical plane about which the mechanism is symmetrical.
Figures 4A, 5:
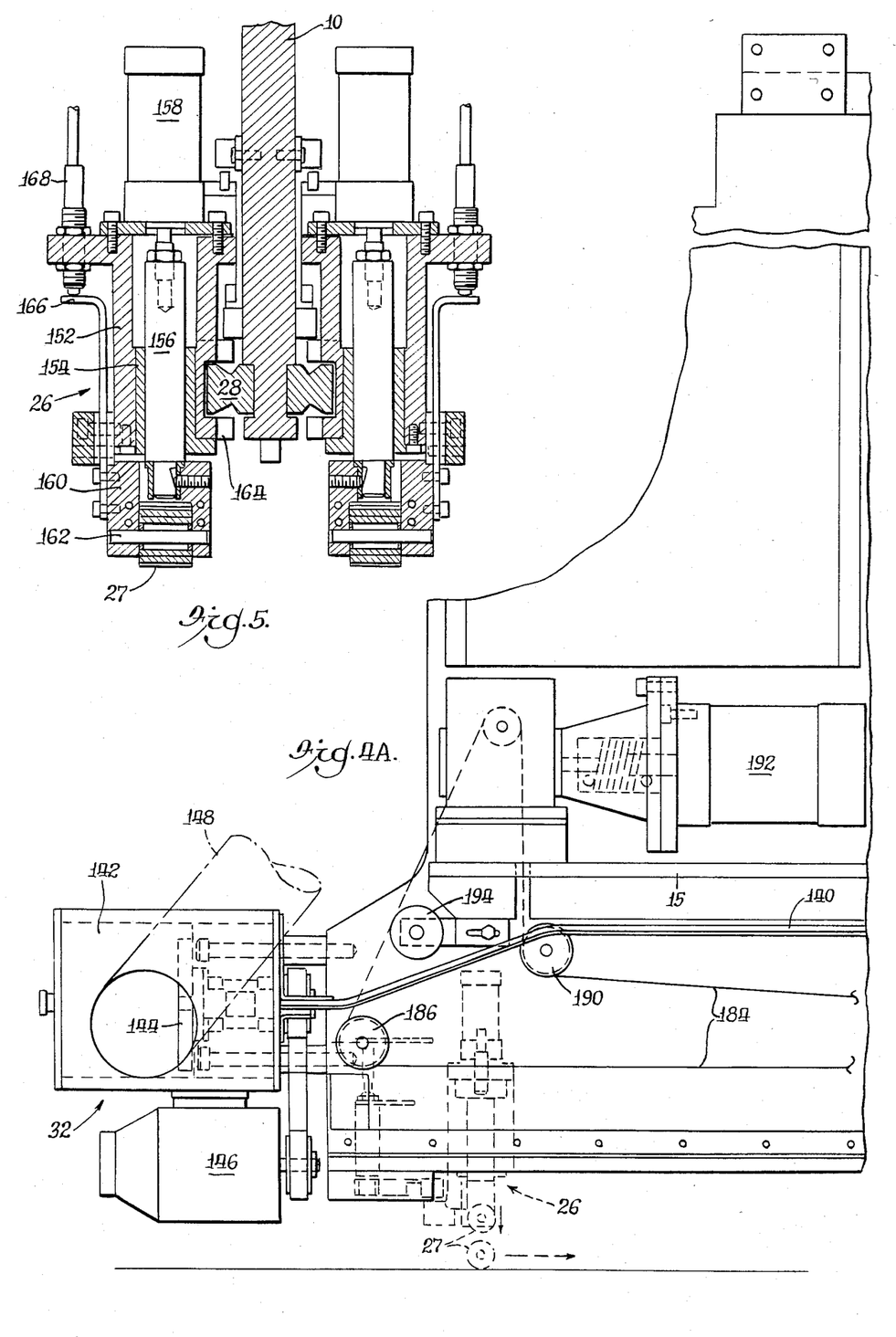
FIGS. 4A and 4B are enlarged fragmentary elevations of the apparatus as seen in FIG. 1.
FIG. 5 is a sectional view taken along the line 5—5 of FIG. 4B to better illustrate the bilateral arrangement of the two separate, but usually-simultaneously-operated tape-laying mechanisms, particularly the mounting of the presser rolls in their movable subcarriages and the mounting of the subcarriages on their respective tracks.
Figure 4B:
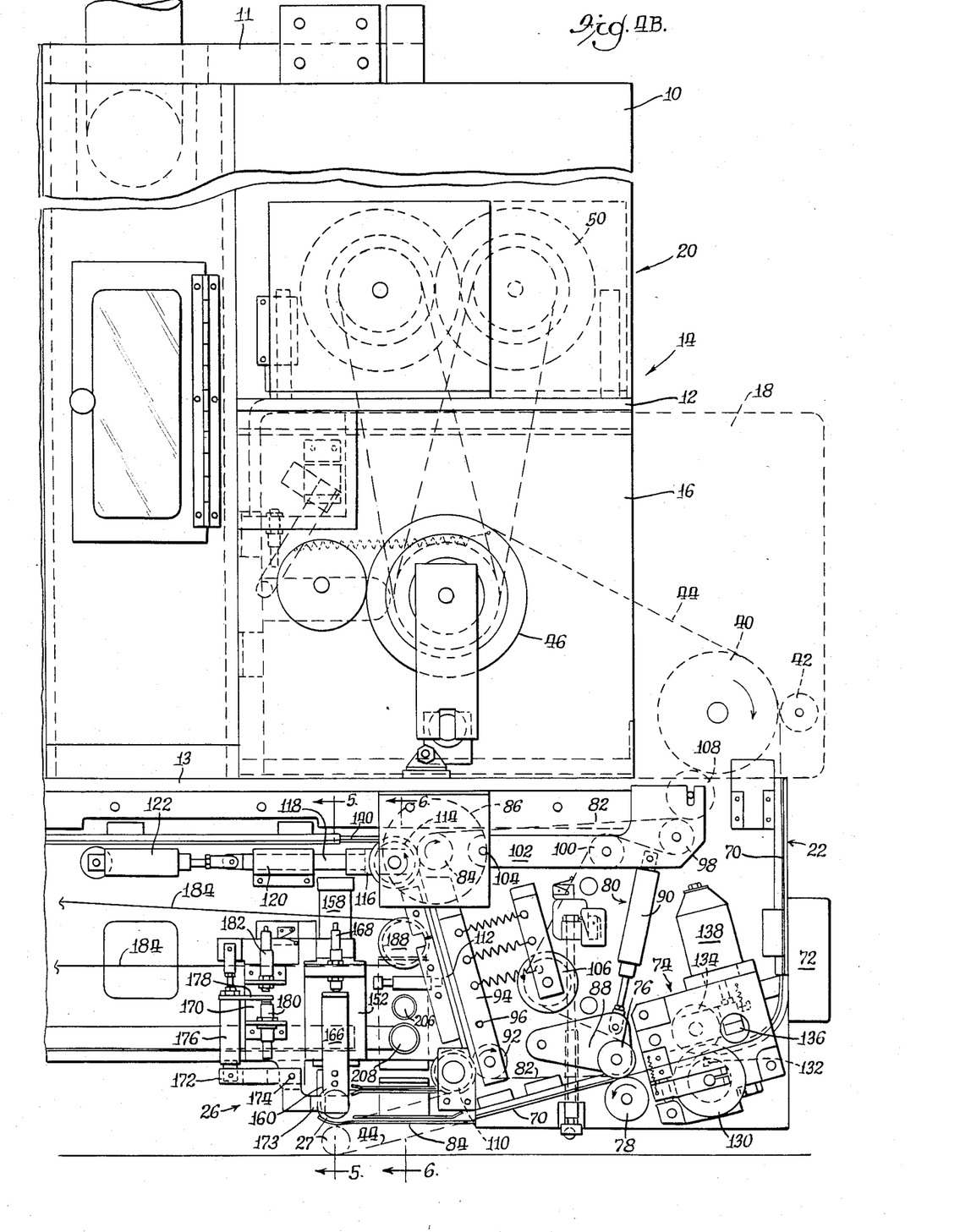

As the operative tape-handling mechanisms are duplicated, with minor exception, in mirror image on opposite sides of the central plate of the frame, the following description made with respect to the near side mechanism, as seen in FIGS. 1 and 4A and 4B, will suffice for both.

Each comprises generally a tape supply section 14, seen in the upper right-hand quadrant of FIG. 1, consisting essentially of a box-like holder 16 for a tape-cassette 18 (shown in broken outline), and an associated retarding mechanism 20 engageable with the tape reel of the cassette.

The tape itself is a two-ply tape comprising a continuous strip of the composite material, with its filamentary core running in the tape direction and with its resin matrix in uncured form, laid upon a paper backing tape from which the composite material is releaseable. As the uncured resin is typically tacky at ordinary temperatures, the loaded cassettes are stored under refrigeration until loaded into the mechanism.

Beneath the tape supply is the tape-feeding, shearing, and backing-tape take-up section 22, and extending to the left therefrom in FIG. 1 is the tape-laying section 24, including the movable subcarriage 26 and the trackage 28 and drive mechanism 30 for its movement on the machine frame.

Still further leftward in FIG. 1 is the scrap disposal section 32 in which the paper backing tape of the two-ply tape is chopped and blown through a scrap conduit to a distant receiver, not shown.

TAPE-SUPPLY SECTION 14

Figure 6:
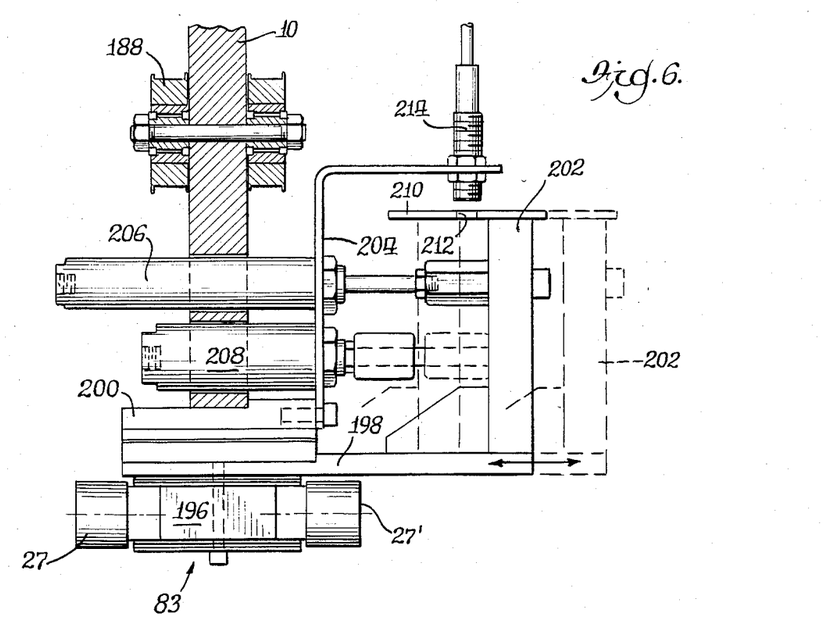
FIG. 6 is a similar sectional view on line 6—6 of FIG. 4B to illustrate detail of the tape threading guide.
Figure 7:
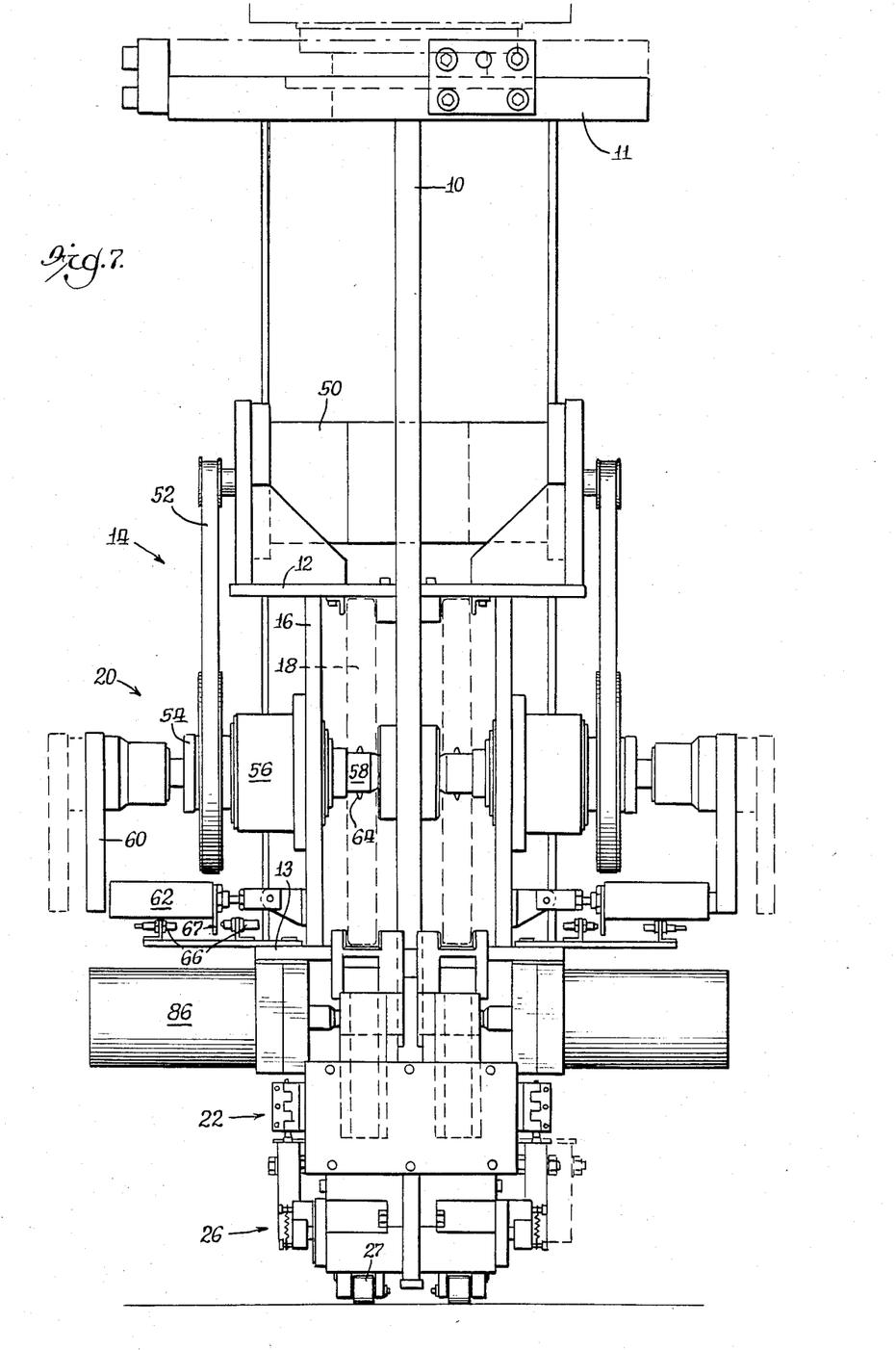
FIG. 7 is an end elevational view of the apparatus from the advancing and tape-loading end, supplying the detail omitted from FIG. 2.
Figure 8:
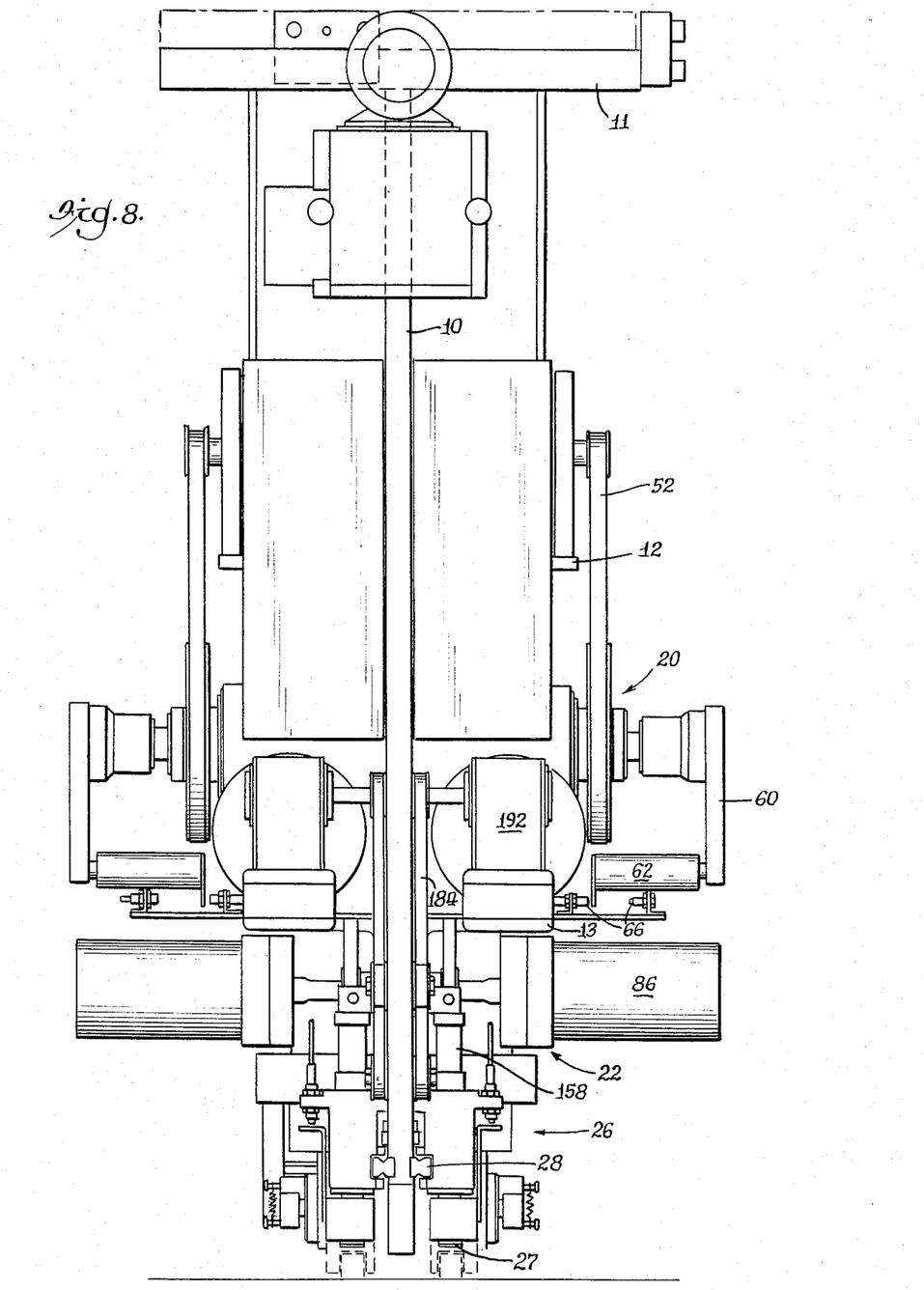
FIG. 8 is an end elevational view of the apparatus from the opposite or following end.

The tape supply section 14, shown in more detail in FIGS. 4B and 6, houses a removable rectangular tape cassette 18 (FIG. 4B) which is loaded into the apparatus from its front end (i.e., from the right of FIGS. 1 and 4B) into upper and lower receiving tracks which position the hub of the cassette reel forengagement with the spindle of the retarding mechanism when the cassette is fully inserted.

Within itself, each cassette has a pair of guide rolls 40 and 42 through the nip of which the tape 44 is taken from the reel 46 when the larger roll 40 is frictionally driven from beneath by the tape-feeding section 22, as will later be described, to deliver the tape downwardly into the tape-feeding section.

The retarding mechanism 20 (FIG. 6) comprises a torque motor 50 connected by means of a timing belt 52 to a hollow spindle 54 journalled in a bearing 56 on the main frame 10 and having a slidably keyed inner spindle 58. The end of the inner spindle remote from the cassette has journalled thereon a shifting arm 60 attached at its opposite end to an air cylinder 62 to move the inner spindle 58 into and out of driving engagement with the hub of the tape reel 46 of the cassette. Such engagement is maintained by spring-loaded detents 64 on the inner spindle engaged with receiving holes in the reel hub. Position switches 66, disposed for actuation by a lug 67 on the air cylinder, and wired into the control circuitry, cooperate with other sensing switches, not shown, to indicate whether a cassette is engaged.

The motor 50 of each retarding mechanism 20 applies a retarding torque opposing the withdrawal of the composite tape 44 from the cassette to prevent overtravel when the tape is being withdrawn, either on forward, laying movement of the mechanism as a whole, or on the run-out movement of the subcarriage 26 in the reverse direction when the tape is being laid in relatively shorter lengths.

THE TAPE FEED, SHEARING, AND TAKEUP SECTION 22

Referring to FIG. 1 for orientation and to FIG. 4B for detail, the tape-feeding, shearing and backing tape takeup section 22 includes a segmented guide channel 70 for receiving the composite tape as it descends from the cassette, and directing it downwardly through an inspection station 72, a flying shear mechanism 74, and through the nip of a pair of threading rolls 76–78 of the threading mechanism 80. After leaving the guide-channel 70, the composite tape 44 reaches out to the press roll 27 of the subcarriage 26, which either directly or ultimately applies the composite tape to the laying surface, depending upon the mode of operation.

In either mode, i.e., whether the tape is laid by the advancing left-to-right movement of the mechanism of FIG. 1 as a whole, or whether by a left-to-right movement of only the subcarriage 26, the tacky composite material is secured to the laying surface by the pressure of the press roll 27 as it rolls from left to right, and, in so doing, also peels the releasable paper backing tape from the composite material by the tension maintained on that tape by the threading mechanism 80 now to be described in somewhat greater detail.

It will be understood that each cassette of the two-ply tape 44, i.e., of the tape of composite material and the paper backing tape adhered thereto, is provided with a substantial leader of the paper backing tape 45 alone, which is used for threading. The leader is pre-threaded through and between the guide rolls 40–42 of the cassette 18, from which it enters the guide channel 70. The leader is driven downwardly in the channel 70 by the rolls 40–42 in the cassette, which are driven for threading purposes in a manner to be described. In the channel 70, the leader first passes through the tape inspection station 72 and the flying shear 74, after which it passes between the threading rolls 76–78, of which the upper roll 76 is actually one of several sheaves around which a timing belt 82, frictionally engaged with the tape leader, is entrained. From the threading rolls 76–78, the leader continues through the tape guide 70 of the threading mechanism from which it emerges into a sidewardly retractable tape guide 83 having parallel lower and upper runs which guide the leader tangentially to and around the press roll 27, and return the leader to the threading mechanism 80.

The threading mechanism 80 (FIG. 4B) comprises the timing belt 82 trained about the drive pulley 84 of a drive motor 86 and a series of sheaves which are biased appropriately to press the timing belt 82 against cooperating rolls strategically located to advance the tape leader. In sequence within the guide channel 70, the first sheave and press roll encountered by the tape leader are the threading rolls 76–78 which immediately follow the flying shear 74, the sheave 76 being mounted on a pivotable arm 88 so as to urge the timing belt 82 into nip-forming engagement with the anvil roll 78 under the effect of an air cylinder 90.

Advancing clockwise along the timing belt 82 from the sheave 76, the belt is trained about a sheave 92, which is similarly journalled upon a movable arm 94 pivoted at 96 with respect to the machine frame 10.

Proceeding diagonally upwardly, the timing belt is entrained around drive pulley 84, then laterally toward the front of the machine around a return sheave 98, a second return sheave 100, both journalled on an arm 102 pivoted at 104 with respect to the machine frame 10. The timing belt 82 lastly passes about a tensioning sheave 106 before completing the loop to the sheave 76.

Pivoted arms 88 and 102 are connected to the opposite end of the air cylinder 90, so that when the piston rod of the cylinder 90 is extended, the upper and lower pivoted arms are moved apart to cause the threading roll 76 to press the timing belt 82 into driving engagement with the anvil roll 79, and to lift the upper pivoted arm 102 to bring the timing belt 82 into indirect driving engagement with the large tape roll 40 in the cassette 18.

Specifically, at the outer end of the arm 102, an intermediate driving roll 108, journalled on a vertically floating pin on the arm 102, rests in frictional engagement upon the timing belt 82, and is driven by the belt.

When the air cylinder 90 is energized, the arm 102 is urged upwardly to press the intermediate roll 108 against the cassette roll 40, driving the tape leader down downwardly into and through the guide channel 70.

Emerging from the guide channel 70 in the lower left corner of the tape-feeding section 22, as seen in FIG. 4B, the tape leader encounters the lower run of the retractable threading guide 83, which is normally centered between the two tape-laying mechanisms and beneath the central plate 10 of the machine frame, but moved sidewardly to serve either mechanism when threading a new tape.

The lower run of the threading guide comprises two parallel plates of polished sheet metal, the upper of which is bent upwardly at the entering end to flare the entry to the guide, and the lower of which is bent upwardly at its opposite end to partially encircle the press roll 27 in its raised position.

The upper run of the guide 83, similarly formed of two polished plates, is similarly flared to receive the tape leader readily as it circles the press roll 27 and to conduct it back to the tape-threading mechanism.

There it reenters the threading mechanism 80 tangent to an anvil roll 110 journalled in a bracket providing a conforming tape guide around the bottom of the roll 110, to direct the leader into contact with the timing belt 82, which carries the leader upwardly between the diagonally upward run of the belt from sheave 92 to the drive pulley 84, and an opposing guide shoe 112.

With the threading of the leader accomplished, the threading guide 83 is returned to its central position between the tape-laying subcarriages 26 of the two mechanisms.

It is timely now to note that the arm 94 upon which the sheave 92 is journalled is formed at its upper end to extend sidewardly and then to the opposite side of the timing belt 82, where it is loosely pivoted to the journal pin of a yoke 116 in which a pressure roll 114 is journalled. The yoke in turn is secured to the end of a shaft 118 mounted in a slide bearing 120 on the central plate 10. At its end remote from the press roll 114, the shaft is secured to the piston rod of a double-acting air cylinder 122, which, when energized to extend the rod, presses the roll 116 into engagement with the timing belt 82 as it passes around the drive pulley 84, and simultaneously causes the sheave 92 to urge the belt against the anvil roll 110. Energized oppositely, it opens the nips of the timing belt as the belt encircles the lower sheave 92 and the upper pulley 84, and simultaneously draws the belt away from the guide shoe 112, to remove the upward driving force on the paper tape, for reasons which will later become apparent from the description of the tape-laying subcarriage 26.

TAPE INSPECTION AND SHEARING

The tape as withdrawn from the reel of the cassette passes through all direction changes with the paper backing tape on the inside of every turn made before the paper tape is stripped from the composite material at the press roll 27.

So disposed, and upon entering the guide channel 70 after the paper-tape leader is threaded, as earlier described, the composite tape first passes downwardly through the inspection station 72 where it is inspected for the presence of foreign particles. If such are detected, a control circuit (not shown), stops the operation and signals the operator, whose options include abortion and repetition of the interrupted cycle, and cassette replacement if desired.

After leaving the inspection station, the composite tape passes through the flying shear 74, which is adjusted to sever the layer of composite material, but not the paper backing tape, which is relied upon to maintain the threading of the apparatus for each new cycle.

The shear comprises a lower roll 130 in which a knife blade 132 of heavy triangular section is mounted for radial adjustment of the knife edge. The roll 130 is solidly journalled for limited rotation, but spring-urged clockwise, as seen in FIG. 4B, against a stop which positions the knife blade for cutting into the composite material layer of the tape. Opposed to the knife roll 130 on the opposite, or paper, side of the tape is an anvil roll 134 journalled in a pivoted arm 136 connected at its end opposite the arm-pivot to the armature of a powerful short-stroke solenoid 138. Both roll-mounts are adjusted to maintain the knife-edge clear of the tape, but to drive the knife edge through the composite material, moving downstream with the tape, when the solenoid is momentarily energized, after which the anvil roller 134 is withdrawn and the knife roller 130 returns to poised position.

THE SCRAP-DISPOSAL SECTION 22

The final auxiliary to the actual tape-laying function is the scrap-disposal section 32 which bears a necessary functional relation to tape-laying in the alternate mode, i.e., by means of the subcarriage 26, where a measured severed length of composite material in tape form is first drawn from the supply by movement of the subcarriage with the press roll 27 raised from the laying surface, and then lowered to anchor the outer end of the composite layer before rolling back over the composite material to attach it to the laying surface and incidentally to strip away the backing tape.

As will shortly become clear, the outbound movement of the subcarriage 26 simultaneously withdraws a length of two-ply tape from the supply and an equal length of already stripped paper backing tape from the disposal section, reversing the normal direction of movement of the paper tape after stripping and requiring disengagement of the paper tape take-up drive.

As already noted in connection with FIG. 4B, the paper tape received from the press roll 27 is guided around the roll 110, thence upwardly along the guide shoe 112, at the upper end of which it encircles the roll 114 from which it enters a horizontal tape guide 140 through which it proceeds normally from right to left as seen in FIGS. 4B and 4A.

At its end opposite the tape feed section 22 of the apparatus, the tape guide 140 dips and enters the scrap disposal section 32, a housing 142 enclosing a rotating chopping knife 144 belt driven from a continuously operating motor 146 mounted on the underside of the housing. The rotating knife intersects the paper tapes from both tape mechanisms, and reduces them to scrap which is drawn from the housing 142 by induced airflow through the conduit 148 which extends upwardly along the outside of the mechanism, and enters a central box-like housing 150 at the top of the frame. The scrap conduit 148 passes through the housing 150, exiting upwardly through the central hole in the mounting plate 11.

THE TAPE-LAYING SUBCARRIAGE 26

The tape-laying subcarriage 26 is detailed in side elevation in FIG. 4B and in sectional elevation in FIG. 5.

As seen in FIG. 5, the subcarriage 26 is assembled from a milled body block 152 of aluminum alloy which is bored to receive a vertical slide bearing 154 for a slide shaft 156 held against rotation by means not shown. A double-acting air cylinder 158 is mounted atop the body block with its piston rod screwed into the top of the slide shaft 156. Secured to the lower end of the slide shaft is a yoke 160 in which the press roll 27 is journalled on a pin 162.

Secured to the inner face of the body block 152 is a linear bearing 164 which supports the subcarriage for movement along the track 28.

A lug 166 secured to the outside of the roll yoke 160 operates a position switch 168 mounted in a flange at the upper end of the body block to indicate when the press roll 27 is in the raised position shown in FIG. 5.

Referring to FIG. 4B, the body block 152 is extended to the left along its inner side as a plate 170 configured for the mounting of a tape-clamping lever 172 pivoted at 174, and an air cylinder 176 pivoted to the clamping lever 172 with its piston rod pivoted to the mounting plate 170. When the cylinder is energized, a shoe 173 at the end of the clamping lever 172 is engaged with the press roll 27 in the raised position, clamping the paper tape to the roll and immobilizing the roll. A lug 178 extending sidewardly from the cylinder operates position switches 180 and 182 to indicate whether the tape is clamped to roll 27.

The subcarriage 26 is driven along the track 28 by the horizontal lower run of an endless steel tape 184 which is secured to the body block 152 and trained about spaced sheaves 186 and 188 which position the lower run of the tape horizontal and parallel to the track 28. The tape 184 is guided by a directional sheave 190 to the sprocket of a tachometer gear motor 192 mounted on the shelf 13 above the carriage track 28, and adjustably tensioned by a tensioning sheave 194.

THE RETRACTABLE THREADING GUIDE 83

The sideward retractability of the threading guide 83 is best indicated by FIG. 6, a partial section taken on the line 6—6 of FIG. 4B.

From FIG. 6, it will be seen that the pairs of spaced plates which define the upper and lower runs of the threading guide are spaced in parallel relation in tangential alignment with the press roll 27 by a spacing block 196, and that assembly is screwed to a slide 198 movable sidewardly on ways in a mounting block 200 secured to the underside of the central plate 10. The slide is extended to one side of the central plate 10, and is provided at its remote end with an upstanding shifting arm 202. A bracket 204 extending upwardly from the mounting block 202 carries two air cylinders, 206 and 208, mounted one above the other, and accommodated in holes bored in the central plate 10. The upper cylinder 206 is double-acting and has its piston rod secured to the shifting arm 202. The lower cylinder 208, of larger bore and single-acting, simply abuts or bucks the upstanding shifting arm 202 of the slide, and is provided with a spring return which retracts its rod when de-energized. A lug 210 at the upper end of the shifting arm 202 is provided with a hole 212 which is normally positioned beneath the sensing element of a proximity position switch 214 mounted on an extension of the cylinder mounting bracket. The switch accordingly senses movement of the threading guide to one side or the other of its retracted central position between the press rolls 27 and 27' of the two tape-laying mechanisms.

The piston rod of the lower cylinder 208 is normally retracted to the solid line position of FIG. 6, at which location the spacing nut secured to the end of the rod provides an abutment to determine the position of the threading guide 83 when moved to the left in FIG. 6 (out of the plane of the paper in FIG. 4B) for the threading of the roll 27 when the upper double-acting cylinder 206 is energized to shift the threading guide to the left in FIG. 6. The opposite position, at which the threading guide serves the pressure roll 27' of the other tape mechanism, is determined by full extension of the rod of the upper cylinder 206 when energized for extension.

To return the threading guide to the retracted central position from either side, the lower cylinder 208 is energized and extends its rod and spacing nut to its dotted line, center-establishing position. The force of the lower cylinder 206 overcomes that of the upper cylinder in either direction and either moves the slide to, or stops the slide at, the center position against the opposing force of the upper cylinder. At that point, both cylinders are vented.

It should be noted that the lower pair of plates of the threading guide 83 are notched to provide clearance for the downward travel of the yoke 160 of the press roll 27, slightly reducing the width of the lower plate where it is bent up toward the roll 27. It may now also be noted that the threading path around the roll 27 includes the arcuate shoe 173 of the clamping lever 172, and thereafter the arcuately formed roll housing of the yoke 160.

CONTROL

Figure 9:
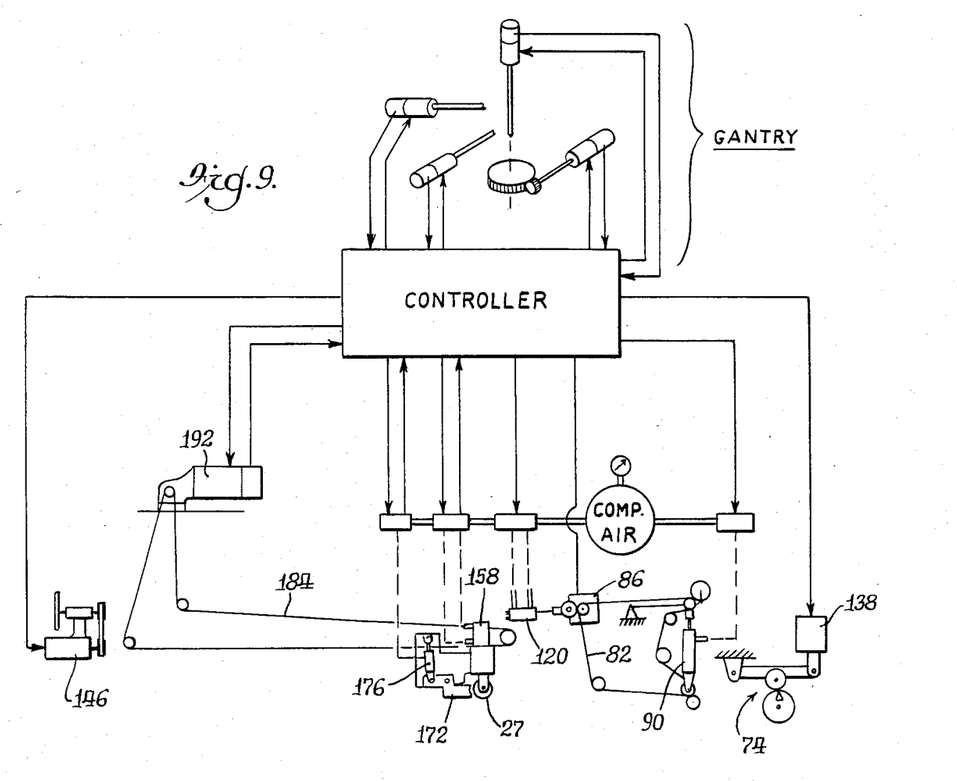
FIG. 9 is a diagram of the control logic for the improvements which comprise the invention.

The sequencing of operation of the several active components of the tape-laying head described and shown is performed by a conventional computerized numerical controller which, in and of itself, forms no part of the present invention, and is therefore reduced to simple diagrammatic form in FIG. 9.

Where individual components have previously been indicated as air-cylinder operated, the cylinders in question are shown connected to solenoid-operated valves which in turn are energized by the controller through relays (not shown). To simplify the diagram, the position indicating feedback from the tape-threading guide 83, the press roll 27, and the tape clamp 172 are shown as taken from the solenoid valves instead of directly from the elements controlled.

OPERATION

As earlier indicated, the tape-laying machine of this invention may be operated in either of two modes. The primary mode, to which the improvements of the invention are addressed, contemplates separate movement of the subcarriage 26 while the whole of the mechanism remains stationary during the laying movement of only the subcarriage, this mode being especially suited to laying shorter lengths of tape. The other has been referred to as conventional because it contemplates movement of the entire mechanism, bodily and as a whole.

When operating in the novel primary mode permitted by the subcarriage 26, the latter is drawn to the left from its position in FIG. 4B, with the press roll 27 retracted and the tape clamped firmly to the press roll by the clamping lever 172. The leftward movement of the carriage 26 with the tape clamped to the roll 27 draws the two-ply tape from the supply and simultaneously withdraws a similar length of paper tape backwardly through the scrap guide 140 against the normal direction of its flow. To permit the withdrawal of the paper tape from the tape guide 140, the timing belt 82 is disengaged from the guide shoe 112 on the upward run of the paper tape, this being done by energizing the air cylinder 122 to extend its rod to move the yoke 116 to the right (FIG. 4B) to move the lever 94 away from the guide shoe 112.

It will be noted from FIG. 4A that the farthest travel of the subcarriage 26 from its normal position (FIG. 4B) is less than the length of paper tape in the scrap guide 140 leading to the scrap chopper, so that even at maximum lay with the subcarriage 26, the paper tape is not unthreaded from the tape guide 140.

The shear is operated at the programmed time to sever a predetermined length of tape, and indeed, when laying tape lengths shorter than the distance between the shear and the press roll 27 when fully retracted, the shear may be programmed to anticipate succeeding cycles.

When the subcarriage has proceeded to the desired initiation site, the press roll 27 is extended by the air cylinder 158 and the composite material layer of the tape is thereby implanted on the laying surface. The carriage 26 is then retracted from left to right, pressing the tape down, while the peeled paper tape is taken up by the timing belt 82, now reengaged with the guide shoe 112 by the retraction of the yoke 116 by the air cylinder 122. Retraction of the subcarriage continues until the press roll 27 is over the cut, at which point the roll 27 is raised to lift the unlaid composite material from the laying surface.

Both mechanisms are preferably used simultaneously, and the entire mechanism is indexed sidewardly by one tape width for laying the next pair of tapes, until eight tape lengths have been laid side by side with the illustrated mechanism, whose tapes have a one-inch width and a space of three inches between adjacent edges of simultaneously laid tapes. The entire mechanism is then indexed sidewardly by five tape widths to resume laying by repeating the procedure above described. The two tape-laying mechanisms are preferably separately controllable as to the initiation and completion points of each individual tape lay, as may be required by the shape of the overall sheet to be constructed and by the direction of the tape relative to the geometry of the sheet.

Similarly, it will be appreciated that, inasmuch as the tape is withdrawn from the supply without being first attached to the laying surface, as in the conventional laying mode, the tape can be withdrawn from the supply while the mechanism as a whole is indexing sidewardly, greatly speeding the overall process by overlapping the indexing and tape-laying cycles of the apparatus.

The operational mode permitted by the novel and separately movable subcarriage 26 greatly increases the flexibility and speed of the apparatus for laying up intricate shapes and shapes which require short lengths of tape.

The mechanism may, however, also be operated in the conventional mode for longer tape lays. In such case, the mechanism is moved by the gantry to the point of initiation of the first lay, and the mechanism is lowered to the prescribed distance from the laying surface and turned to the desired laying direction. The roll 27 is then forcibly lowered to implant the composite material on the laying surface and the gantry, by programmed and coordinated movement on one or both of its horizontal axes, moves the roll 27 in the laying direction, proceeding over the two-ply tape being withdrawn from the supply by the movement of the mechanism away from the anchored end of the tape. At the same time, the take-up tension applied to the paper tape by the upward run of the timing belt 82 pressing the paper tape against the guide shoe 112, peels the backing tape from the composite material and delivers it into the scrap guide 140.

At the programmed time, the shear operates to sever the composite material layer of the tape, and the forward movement of the mechanism in the laying direction continues until the press roll 27 is over the cut, at which time the roll 27 is retracted, raising the unlaid tape from the laying surface. The entire head is then rotated 180°, indexed one tape width, and proceeds in the opposite direction, repeating the process until eight tape widths are laid.

The features of the invention believed new and patentable are set forth in the appended claims.

What is claimed is:

1. In a machine head for laying a tape of composite material from a two-ply tape consisting of a layer of said composite material laminated to a strippable backing tape,
    said machine head being adapted for suspension from the movable carriage of a gantry or the like which provides controlled linear movement of the carriage above, and along three rectilinear axes with respect to, a laying surface positioned to receive the composite material from said machine head and which provides controlled rotation of a portion of the carriage about a vertical axis,
    said machine head comprising
    a frame adapted to be secured in suspension from the rotatable portion of said movable carriage,
    a tape supply mechanism mounted on the frame and comprising a power-driven restraining spindle removably engageable with the hub of a supply reel of said two-ply tape,
    a tape guide for conducting said two-ply tape from the supply reel,
    a flying shear disposed along said tape guide and operable to sever the composite material transversely of the two-ply without severing the backing tape,
    a tape-laying mechanism for laying a severed length of the composite material upon said surface,
    a take-up mechanism for conveying the backing tape away from the tape-laying mechanism, and
    a control mechanism for synchronizing the operations of said gantry carriage, said tape-supply mechanism, said shear, said tape-laying mechanism and said take-up mechanism to effect the laying of a predetermined length of composite material in tape form upon a laying surface between two points on said surface,
    the improvement wherein the tape-laying mechanism comprises
    a subcarriage reciprocable along a horizontal track on the frame of the machine head from and to a normal position adjacent the delivery end of the tape guide, a yoke vertically reciprocable on said subcarriage, a tape presser roll journalled in said yoke and about which the backing tape is trained between the tape guide and the take-up mechanism, power-operated means for urging said yoke resiliently toward said laying surface to implant the composite material of said two-ply tape upon said surface, said yoke being normally raised on the subcarriage to maintain the presser roll and entrained tape above said laying surface, a power-operated tape clamp on said subcarriage engagement with said presser roll in its normal raised position to secure the backing tape thereto, a power-driven mechanism for advancing and retracting said subcarriage through a variable measured distance between selected points along said track, said control means synchronizing the operations of said subcarriage, flying shear, tape clamp, roll yoke and take-up mechanism to maintain the engagement of the tape clamp with the presser roll as the subcarriage advances thereby to draw a measured length of the two-ply tape from the tape guide and a corresponding length of backing tape from the take-up mechanism, to release the clamp and to cause the presser roll to implant the end of a severed length of the composite material upon said laying surface, and then to roll back over the two-ply tape to press said severed length to the laying surface while simultaneously removing the backing tape from the laid composite material and from the laying site.

2. The subject matter of claim 1 wherein a movable tape-threading guide is provided to effect the entrainment of the backing tape about the presser roll, said tape-threading guide comprising a frame having thereon a pair of tape guide sections extendable into the path of the backing tape to and from the presser roll, but normally retracted sidewardly from said path, said guide sections respectively extending from said delivery end tangent to said presser roll in the raised position and tangent from said pressure roll to said take-up mechanism.

3. The subject matter of claim 2 wherein the take-up mechanism includes an endless belt trained about pulleys movably mounted to frictionally engage said backing tape against an opposing shoe to advance the backing tape toward a disposal mechanism, and means for selectively engaging the belt with said backing tape only on the return stroke of said subcarriage, thus to remove the take-up tension on the backing tape at other times to permit the same to be withdrawn from the take-up mechanism during the advancing movement of said subcarriage.

4. The mechanism of claim 3 further adapted to thread a leader portion of the backing tape of said two-ply tape from a supply reel through the tape guide, flying shear, tape-threading guide, tape-laying mechanism and take-up mechanism, wherein said endless belt is trained about other pulleys movably mounted to press the belt into engagement with said leader portion and against backing rolls forming part of said tape guide adjacent the entry and delivery ends thereof to advance the leader portion through said tape guide and tape-threading guide, and to disengage said leader portion from said backing rolls when the leader portion is frictionally re-engaged by the endless belt against said shoe.

5. The subject matter of claim 1 wherein the tape supply mechanism, tape guide, flying shear, tape-laying mechanism, and take-up mechanisms are duplicated as mirror images on opposite sides of a central plane of said frame and the laying paths of their respective presser rolls are spaced apart by an integer multiple of the width of said tape.

6. The subject matter of claim 2 wherein the tape supply mechanism, tape guide, flying shear, tape-laying mechanism, and take-up mechanisms are duplicated as mirror images on opposite sides of a central plane of said frame and the tape-threading guide, when retracted, is positioned between the tape paths to the two presser rolls and movable sidewardly into either of said paths to thread the backing tapes about their respective presser rolls.

7. The subject matter of claim 2 wherein the take-up mechanism for the backing tape includes in sequence a normally disengaged backing tape drive and a second tape guide leading therefrom to a scrap disposer, and wherein said second tape guide has a length sufficient to accommodate the maximum advancing stroke of the tape-laying subcarriage without unthreading the backing tape from said second tape guide.

* * * * *

UNITED STATES PATENT AND TRADEMARK OFFICE
CERTIFICATE OF CORRECTION

PATENT NO. : 4,508,584

DATED : April 2, 1985

INVENTOR(S) : Paul A. S. Charles

It is certified that error appears in the above-identified patent and that said Letters Patent is hereby corrected as shown below:

Column 3, line 22, change "forengagement" to --for engagement--.

Column 4, line 61, change "79" to --78--.

Column 6, line 27, in the subtitle, change "22" to --32--.

Column 7, line 52, after "that" insert --that--.

Column 8, line 63, change "while" to --whole--.

Column 10, line 50, after "two-ply" insert --tape--.

Column 11, line 12, change "engagement" to --engageable--.

Signed and Sealed this

Tenth Day of December 1985

[SEAL]

*Attest:*

DONALD J. QUIGG

*Attesting Officer*  *Commissioner of Patents and Trademarks*